April 25, 1950  J. C. HUGHES  2,505,711
AUTO TIRE ANTISKID DEVICE
Filed Aug. 22, 1947

J.C. Hughes
INVENTOR.

BY C.A.Snow&Co.
ATTORNEYS.

Patented Apr. 25, 1950

2,505,711

UNITED STATES PATENT OFFICE 2,505,711

AUTO TIRE ANTISKID DEVICE

James C. Hughes, New City, N. Y.

Application August 22, 1947, Serial No. 770,046

1 Claim. (Cl. 152—233)

This invention relates to anti-skid devices for use in connection with motor vehicle tires, the primary object of the invention being to provide an anti-skid device which may be readily and easily secured to a motor vehicle tire, eliminating the necessity of elevating the wheel and tire as is customary in applying chains and similar anti-skid devices now in common use.

An important object of the invention is to provide an anti-skid device of this character which will be securely held in position on the tire against displacement, the application of the anti-skid device being accomplished by merely positioning the frame of the anti-skid device, over the tread of the tire, the securing means being operated from a point at the outer surface of the tire on which the anti-skid device is being positioned, thereby rendering the application of the anti-skid devices, comparatively an easy matter.

With the foregoing and other objects in view which will appear as the description proceeds, the invention consists of certain novel details of construction and combinations of parts, hereinafter more fully described and pointed out in the claim, it being understood that changes may be made in the construction and arrangement of parts without departing from the spirit of the invention as claimed.

Referring to the drawing

Figure 1:
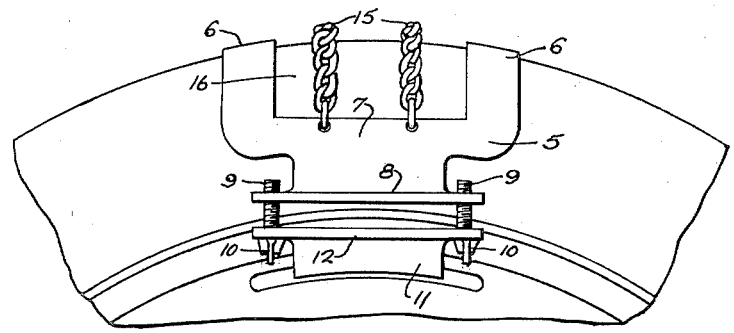
Figure 1 is a side elevational view of an antiskid device constructed in accordance with the invention, as secured to a motor vehicle tire.
Figure 2:
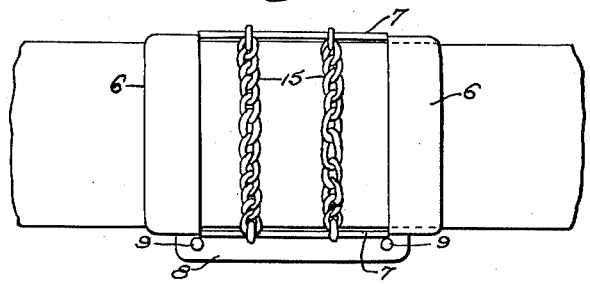
Figure 2 is a plan view thereof.

Referring to the drawing in detail, the device comprises a substantially rectangular frame or body portion 5 which is transversely curved to fit over the tread of a motor vehicle tire, as clearly shown by Figure 1 of the drawing.

The frame includes end bars 6 which are connected by the side bars 7, the side bars 7 at one side of the frame, being provided with a laterally extended flange 8 which is formed with openings through which the bolts 9 extend, the bolts 9 being provided with wing heads 10 by means of which the bolts may be threaded through the openings of the flange 8.

Figure 3:
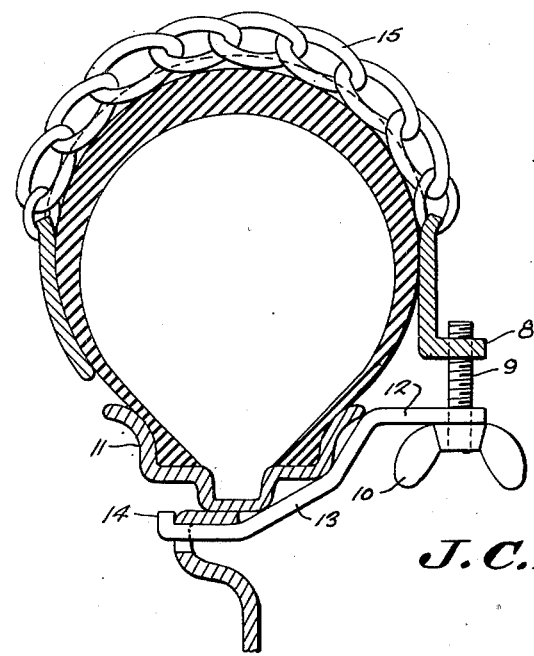
Figure 3 is a transverse sectional view through the tire and anti-skid device.

The reference character 11 indicates the securing plate, by means of which the anti-skid device is secured in position on a motor vehicle tire, and as shown includes a laterally extended flange 12 and an inwardly extended main portion 13 formed with an upstanding rib 14 the main portion being designed to extend into a slot formed in the wheel proper, the rib contacting with a portion of the wheel, as shown by Figure 3 of the drawing.

Thus, it will be seen that by rotating the bolts 9, after the main portion 13 of the securing plate has been positioned within the slot of the wheel, the flanges 8 and 12 will be drawn towards each other tightening the frame on the motor vehicle tire.

Cross chains 15 connect the side bars 7, the cross chains being disposed in spaced relation with respect to each other, and extended across the rectangular opening 16 formed between the bars 6 and 7 constituting the frame of the device.

From the foregoing, it will be seen that due to the construction shown and described, these anti-skid devices may be readily and easily secured in position over a motor vehicle tire tread providing the necessary traction for the wheel, when travelling over slippery or muddy road surfaces.

What is claimed is:

An anti-skid device for a motor vehicle tire, comprising a substantially rectangular body portion including side bars and end bars connecting the side bars, a plurality of chains connected with the side bars and adapted to fit over the tread of the tire on which the anti-skid device is positioned, a flange extending laterally from one edge of one of the side bars, said flange having openings, a securing plate adapted to be extended into an opening of the wheel on which the tire is positioned, a rib extending from the securing plate engaging the wheel adjacent to the opening in which the plate is held, a flange on the securing plate formed with openings, the flange of the securing plate extending in parallel spaced relation with the flange of the side member and having openings aligning with the openings of the flange of the side member, and securing screws extending into the aligning openings, holding the securing plate and body portion in position on a tire.

JAMES C. HUGHES.

REFERENCES CITED

The following references are of record in the file of this patent:

UNITED STATES PATENTS

| Number | Name | Date |
|---|---|---|
| 1,115,622 | Vickers | Nov. 3, 1914 |
| 1,536,362 | Traner et al. | May 5, 1935 |
| 2,154,047 | Krider | Apr. 11, 1939 |
| 2,315,838 | Bryon | Apr. 6, 1943 |

FOREIGN PATENTS

| Number | Country | Date |
|---|---|---|
| 546,364 | Great Britain | July 9, 1942 |